April 22, 1941.  R. E. REASON  2,239,469
SIGHTING TELESCOPE
Filed Jan. 13, 1939
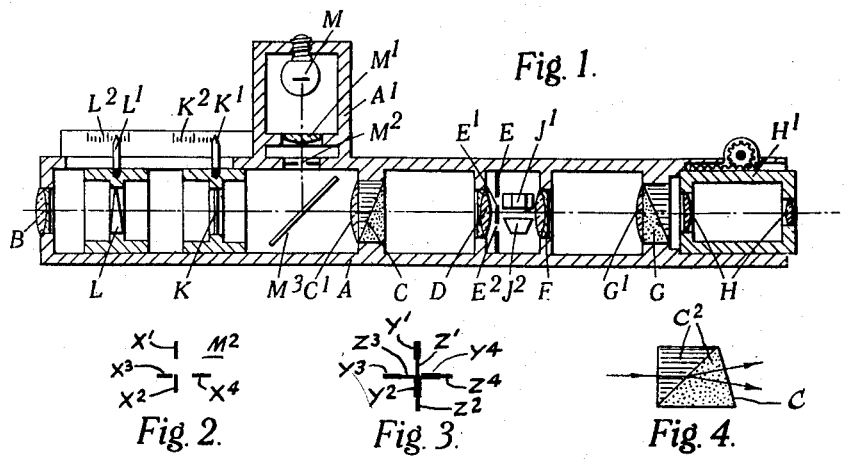
Inventor
R. E. REASON,
by
Blair Kilgour
Attorney Patented Apr. 22, 1941

2,239,469

UNITED STATES PATENT OFFICE 2,239,469

SIGHTING TELESCOPE

Richard Edmund Reason, Leicester, England, assignor to Kapella Limited, Leicester, England, a company of Great Britain Application January 13, 1939, Serial No. 250,855
In Great Britain January 14, 1938

11 Claims. (Cl. 88—2.2)

This invention relates to a sighting telescope, more especially intended for the precision measurement of the angular or lateral displacement of a member by observing with the aid of an observing system in the telescope the displacement of the image of a mark or other sighting object formed by an objective in the telescope. Such a telescope may be arranged as an auto-collimating telescope by providing the sighting object within the telescope itself so that a virtual image of the image is formed at infinity by the telescope objective, the telescope being sighted on such virtual image as reflected in a plane mirror carried by the member whose displacement is to be measured. Alternatively the sighting object may be in the form of a mark on the member itself, the telescope being focussed on such mark, but in this case a practical difficulty arises in that a high degree of accuracy is required in the mounting of the objective or other element or elements movable for focussing purposes, since even a slight lateral error in the position of the objective will give rise to a considerable error in the measurement of the displacement of the observed member.

The present invention, although applicable to an auto-collimating telescope, is more particularly concerned with a focussing telescope, and has for its object so to arrange the optical system of the telescope as to enable the focussing adjustment to be readily and easily effected without detriment to a very high degree of accuracy in the determination of the position of the observed image.

The sighting telescope according to the invention comprises an objective, means for dividing the light from the objective into two portions and for recombining the two portions whereby the partial images formed respectively with the two portions can be simultaneously viewed through an eyepiece, and means for reversing the displacement of one partial image relatively to that of the other partial image, the arrangement being such that the useful fields in which the two partial images are formed are coextensive and that the path lengths of the two portions of the light are equal or are otherwise such that a change of distance of the sighting object would cause the two partial images to move at equal rates. The entrance pupils of the whole system for the two portions of the light are preferably coincident with one another.

In order to facilitate measurement of the displacement of the member under observation, adjusting means may be provided whereby the two partial images can be brought into superposition or alignment, such means conveniently comprising one or more deviating devices (for example sliding or rotating wedges) adjustably mounted within the telescope.

Although reversal of the displacement of one partial image in one direction only will often suffice, it will more usually be preferable to effect relative reversal of the image displacements in two mutually perpendicular directions (either by reversing the displacement of one partial image in both directions or by reversing the displacement of one partial image in one direction and of the other partial image in the direction at right angles).

The invention may be carried into practice in various ways, but a preferred arrangement according thereto is illustrated by way of example in the accompanying drawing, in which Figure 1 is a longitudinal section, Figure 2 shows a convenient form of sighting mark for use with the construction of Figure 1, Figure 3 shows the appearance of the images of the sighting mark of Figure 2 as seen through the eyepiece when the deviators have been properly adjusted, and Figure 4 illustrates a modification of part of Figure 1.

In the arrangement of Figure 1, the telescope comprises a tubular casing A having an objective B mounted within it at one end. The division of the light from the objective B into two portions is effected by double refraction, a Wollaston prism C in conjunction with a field lens $C^1$ being mounted in a position at or near the principal focus of the objective B, so that the ordinary and extraordinary rays are used for the two portions. The two beams pass from the Wollaston prism C to an objective D having its principal focus in the neighbourhood of the prism C, and thence through a mask E having two apertures $E^1E^2$ respectively for the two beams to a second objective F, the two beams being recombined by a second Wollaston prism G, mounted in conjunction with a field lens $G^1$ near the focus of the second objective F, for transmission to an eyepiece H.

Thus in the case when the telescope is arranged as a focussing telescope for sighting on a mark carried by the member whose displacement is to be investigated, an image of the sighting mark is formed by the main telescope objective B in the neighbourhood of the first Wollaston prism C, whilst the two other objectives D, F act to form a second image (or more strictly two partial images, one formed with each beam) in the neighbourhood of the second Wollaston prism G.

Between the two objectives D, F are two similar reversing devices, such as Dove's prisms J¹J², one in the path of each beam, acting respectively to reverse the two partial images in two directions at right angles to one another. Thus if the sighting object is in the form of a cross with its arms extending in directions corresponding to those in which the reversal is effected, the two observed partial images will be superimposed on one another if the first image formed by the main telescope objective B is in a central position. If, however, the first image is displaced from the central position, the two partial images will be displaced in opposite directions and will no longer be superimposed.

Between the main telescope objective B and the first Wollaston prism C and extending across the whole field of the objective are two sliding wedges K, L, each provided with a pointer K¹ of L¹ moving over a graduated scale K² or L², the edges of the two wedges being at right angles to one another. Thus axial movement of either wedge will cause the first image formed by the main telescope objective to be displaced in a direction at right angles to the edge of the wedge, and in use the two wedges are moved to positions in which they compensate respectively for the lateral displacements in the two mutually perpendicular directions of the sighting mark on the observed member and bring the first image into its central position in which the two observed partial images are superimposed. Instead of employing a sliding wedge, any other suitable form of deviating device may be employed.

The overlapping observed images resulting from this arrangement reduce the sensitivity and, to offset this, differently coloured filters may be provided in the mask apertures E¹E², or alternatively the sighting mark M² may be in the form of a mutilated cross as shown in Figure 2, consisting for example of the upper halves X¹X² of the vertical arms of the cross and the righthand halves X³X⁴ of the horizontal arms of the cross. In this case when coincidence is obtained in both directions, the partial image Y¹Y²Y³Y⁴ formed by the rays passing through the reversing prism J¹ and the partial image Z¹Z²Z³Z⁴ formed by the rays passing through the reversing prism J² will together make up a complete cross without any overlapping (see Figure 3).

Rochon prisms C² may be used, if desired, instead of Wollaston prisms, the faces C³ nearer the objectives being inclined as indicated in Figure 4 (or provided with additional glass prisms) to make the ordinary and extraordinary rays symmetrical with respect to the optical axis of the telescope.

In this arrangement the two beams have equal path lengths and coincident entrance pupils and also coextensive fields at the points of division and recombination. These properties render it unnecessary for the first and second images to be formed exactly at the points of division and recombination respectively, so that focussing can be effected solely by axial movement of the eyepiece H without the necessity for moving either the main telescope objective B or the complete observing system including the Wollaston prisms CG and the two objectives DF and reversing devices J¹J². The eyepiece H is therefore housed in an axially adjustable mount H¹ in the telescope tube A and there is no necessity for any very great accuracy in its mounting, for any slight lateral error there may be in the positioning of the eyepiece will not affect in any way the formation of the two partial images or their superposition and thus will not interfere with the accuracy of the measurement of the displacement of the member under investigation.

The telescope may be arranged for alternative use as a focussing telescope or as an auto-collimating telescope by providing the telescope tube (as shown) with a lateral branch A¹ at a point slightly in front of the first Wollaston prism C, this lateral branch containing a source of light M, a condensing lens M¹ and a cross-shaped aperture M² constituting a sighting object. Adjacent to the aperture M² and intersecting the optical axis at 45° is a thin film M³ constituting a semi-transparent reflector for deflecting the rays from the object aperture M² towards the main telescope objective B, the reflection of the aperture in the film M³ lying at the principal focus of the objective B. The rays from the aperture M² thus emerge from the objective B parallel to one another and are reflected back by a plane mirror carried by the member whose displacement is to be measured. For use as an auto-collimating telescope, the eyepiece H is located in its end position for focussing at infinity. When the telescope is required for sighting on a mark on the observed member at a finite distance, the source of light M in the lateral branch A¹ is extinguished and the eyepiece H is moved to the appropriate focussing position. When the telescope is required for use only as an auto-collimating telescope, the eyepiece H may be fixed in position in the telescope tube A.

It will be appreciated that the foregoing arrangements have been described by way of example only and may be modified in various ways within the scope of the invention. Thus, for instance, it is not essential to provide for reversal of the image displacement in two directions and the arrangements described may be simplified by the omission of one of the two reversing prisms, care being taken (for example by the provision of a glass block) to maintain equal path lengths for the two portions of the light.

What I claim as my invention and desire to secure by Letters Patent is:

1. In a sighting telescope, the combination of an objective, a double image prism for dividing the light from the objective into two portions, a second double image prism for recombining the two portions whereby the useful fields in which the two partial images are formed respectively with the two portions are coextensive, an eye-piece through which the two partial images can be simultaneously viewed, and means for reversing the displacement of one partial image relatively to that of the other partial image, the path lengths of the two portions of the light being such that a change of object distance would cause the two partial images to move at equal rates.

2. In a sighting telescope, the combination of an objective, a double image prism for dividing the light from the objective into two portions, a second double image prism for recombining the two portions whereby the useful fields in which the two partial images are formed respectively with the two portions are coextensive, an eye-piece through which the two partial images can be simultaneously viewed, and two reversing prisms disposed respectively in the paths of the two portions of the light and acting to reverse the displacements of the associated two partial images respectively in two mutually perpendicular directions, the path lengths of the two portions of the light being equal whilst the entrance pupils for the whole system for the two portions of the light are coincident.

3. The combination with the features set forth in claim 2, of adjustable deviating devices whereby the two partial images can be brought into alignment with one another in both the mutually perpendicular directions.

4. The combination with the features set forth in claim 2, of a sighting object in the form of a mark comprising a mutilated cross whose arms lie in the two mutually perpendicular directions, the mutilations being such that the two partial images as viewed through the eye-piece will combine with one another to produce a single substantially complete cross without overlapping if in alignment with one another in both directions.

5. The combination with the features set forth in claim 1, of means for adjusting the eye-piece to enable the telescope to be focussed on a mark on a member whose lateral displacement is to be measured.

6. A sighting telescope as claimed in claim 1, in which the entrance pupils of the whole system for the two portions of the light are coincident with one another.

7. The combination with the features set forth in claim 1, of adjusting means whereby the two partial images can be brought into alignment with one another.

8. In a sighting telescope, the combination of an objective, a double image prism for dividing the light from the objective into two portions, a second double image prism for recombining the two portions whereby the useful fields in which the two partial images are formed respectively with the two portions are coextensive, an eye-piece through which the two partial images can be simultaneously viewed, means for reversing the displacement of one partial image relatively to that of the other partial image, the path lengths of the two portions of the light being such that a change of object distance would cause the two partial images to move at equal rates, whilst the entrance pupils for the whole system for the two portions of the light are coincident with one another, and at least one adjustable deviating device for bringing the two partial images into superposition.

9. In a sighting telescope, the combination of an objective, a double image prism for dividing the light from the objective into two portions, a second double image prism for recombining the two portions whereby the useful fields in which the two partial images are formed respectively with the two portions are coextensive, an eye-piece through which the two partial images can be simultaneously viewed, means for reversing the displacements of the two partial images relatively to one another in two mutually perpendicular directions, the path lengths of the two portions of the light being such that a change of object distance would cause the two partial images to move at equal rates, and adjustable deviating devices whereby the two partial images can be brought into alignment with one another in both the mutually perpendicular directions.

10. The combination with the features of claim 1, of a sighting object mounted in the telescope at a principal focal point of the objective to enable the telescope to be used as an auto-collimating telescope.

11. The combination with the features of claim 9, of a sighting object mounted in the telescope at a principal focal point of the objective to enable the telescope to be used as an auto-collimating telescope.

RICHARD EDMUND REASON.